UNITED STATES PATENT OFFICE.

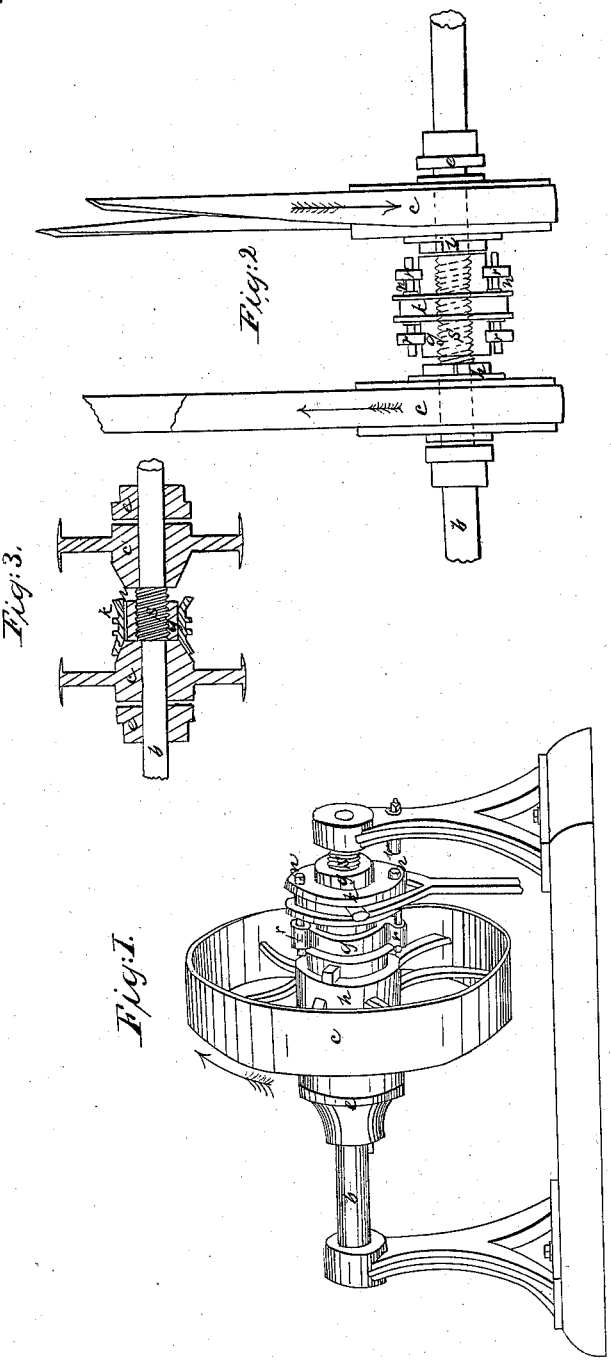

NELSON BARLOW, OF ST. LOUIS, MISSOURI.

FRICTION-CLUTCH.

Specification of Letters Patent No. 7,557, dated August 13, 1850.

*To all whom it may concern:*

Be it known that I, NELSON BARLOW, of the city and county of St. Louis and State of Missouri, have invented a new and Improved Screw Friction-Clutch for Connecting and Disconnecting Machinery While in Motion; and I do hereby declare that the following is a full and exact description thereof, reference being had to the accompanying drawings and forming part thereof.

Figure 1 is a perspective view, which exhibits a method of attachment to a pulley or wheel. Figs. 2 and 3, are sectional views, in which the clutch is exhibited between two pulleys, moving in different direction. In Fig. 3, slight modifications in its construction and form are shown.

$b$, (Figs. 1, 2 and 3,) is a shaft to which is fastened the flange or collar, $e$, which has a true surface upon its side (or it may be conical) to conform to a similar surface upon the hub of the wheel, $c$.

$g$ is a nut and is fitted to the thread of the screws. Upon the shaft, $k$, is a collar, which is fitted to the nut, and is made to slide upon it. $n, n$, (Figs. 1 and 2) are two pins, inserted through and fastened to the collar and pass loosely through the wings or projections, $r, r$, of the nut. A feather or guide-key may be used in place of these pins as shown in Fig. 3. The object is to so connect the collar with the nut that both shall revolve or stand together while the former can be moved to or from the wheel at discretion: this may be done by means of a fork or lever in any well-known and convenient manner. In Fig. 3, the pins $n, n$, are dispensed with. The ends of the collar are fitted to a cone surface upon the hub of the wheel, $c$, and, $c'$, by which it is set in motion when their surfaces may be in contact.

Its operation is the following: the collar $k$ (Fig. 1) is moved by means of its groove, and the pins, $n, n$, are brought into contact with the projections, $h, h$, upon the hub of the pulley, $c$, revolving in the direction indicated by the arrow: the nut and collar are thus set in motion and with the shaft remaining at rest, it is obvious, that the nut $g$, will be turned up against the wheel, and will bring it into contact with the permanent flange or cone, $e$, with a force sufficient to set the shaft in motion. In disengaging, the collar (Fig. 1) is withdrawn and the pins, $n, n$, are brought into contact with the pin, $i$ which is stationary: this arrests the motion of the nut and withdraws it from the wheel from which it is at once disconnected.

In Figs. 2 and 3 the disengaging from one pulley is accomplished by connecting with another, running in an opposite direction; this reverses the motion of the nut and brings it in contact with whichever the collar may be in connection. In attaching this clutch to different machines, modifications will be suggested. The screw upon the shaft must be either right or left-handed thread, when placed upon one or the other side of pulleys, turning in different directions, and according to circumstances.

The arrangement (Fig. 3) is perhaps better adapted for machinery requiring a rapid motion. It is not necessary that the nut be kept in alternate action. If the collar be thrown into connection with the opposite pulley and be instantly withdrawn, both pulleys revolve free. This and also the plan Fig. 3 are well adapted for screw-cutting lathes and iron planing machines. This clutch obviates the serious difficulties before experienced in the use of this species of coupling, where light and delicate machinery is used. The screw sets it in action so gently, that the finest wheels are not broken and adjusts itself perfectly to the amount of power required.

Another feature is the absence of all friction from the collars of the shaft, and from the grooved sliding collar, $k$, by the action of the fork. The collar is simply the agent to connect the nut with the wheel: it may be withdrawn or be suffered to revolve without the application of force to hold it in place, while the nut being screwed to the wheel has a perfectly independent action. It is simple and effective and can be used to advantage in nearly every case where a clutch or loose pulley is required.

What I claim as new and desire to secure by Letters Patent, is—

The sliding collar, $k$, connected to and in combination with the nut $g$ substantially in the manner and for the purposes herein specified.

NELSON BARLOW. [L. s.]

Witnesses:
JOSEPH POWELL,
JOHN C. POWELL.